Figure 1:
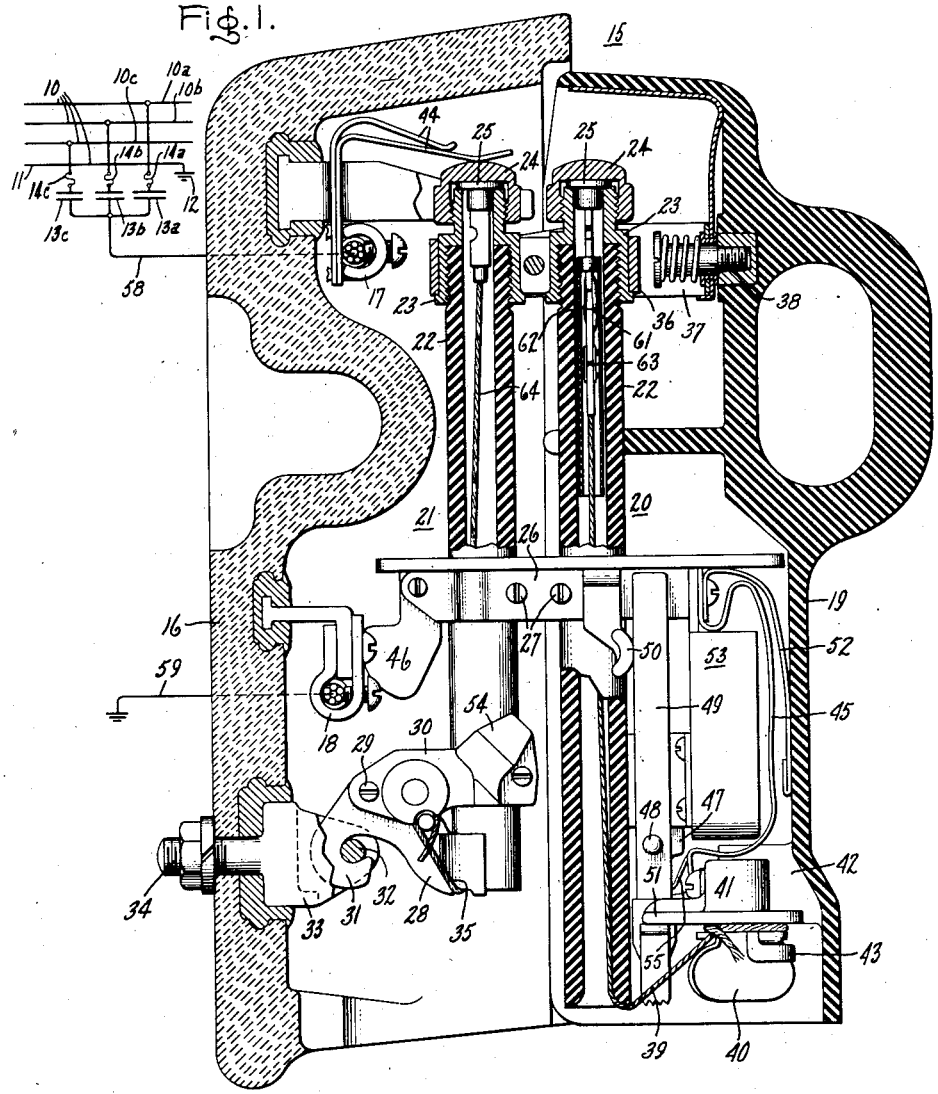

March 13, 1945.   R. S. BENNETT   2,371,496
PROTECTIVE ARRANGEMENT.
Filed May 28, 1942   2 Sheets—Sheet 1

Inventor:
Ralph S. Bennett,
by Harry E. Dunham
His Attorney.

March 13, 1945.     R. S. BENNETT     2,371,496
PROTECTIVE ARRANGEMENT
Filed May 28, 1942     2 Sheets-Sheet 2
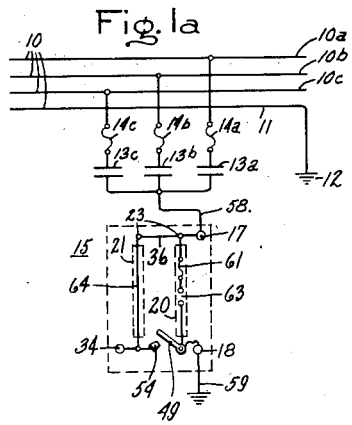
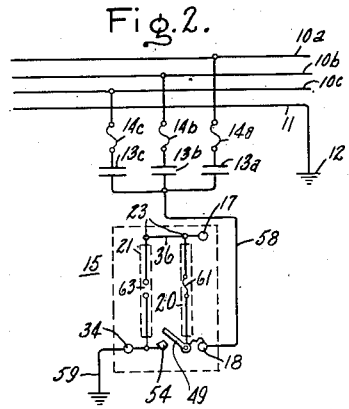
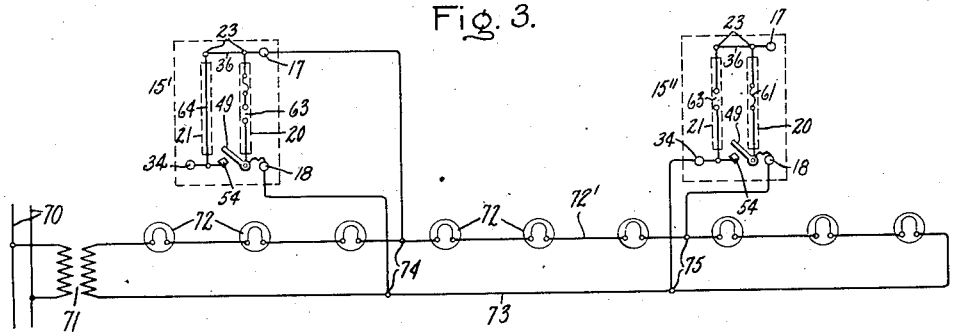
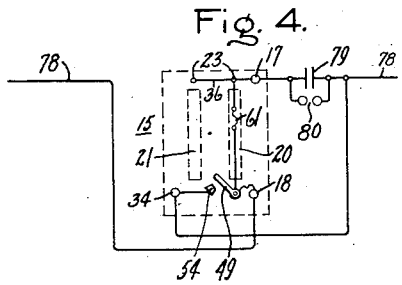
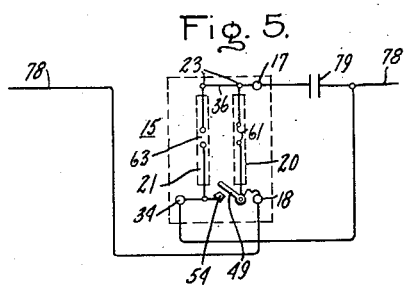
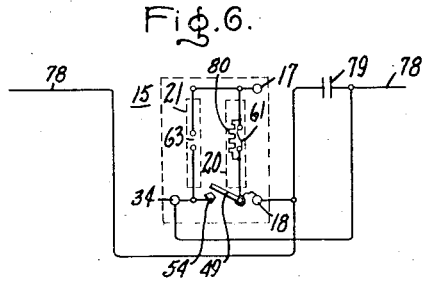
Inventor:
Ralph S. Bennett,
by Harry E. Dunham
His Attorney.

Patented Mar. 13, 1945

2,371,496

UNITED STATES PATENT OFFICE 2,371,496

PROTECTIVE ARRANGEMENT

Ralph S. Bennett, Pittsfield, Mass., assignor to General Electric Company, a corporation of New York Application May 28, 1942, Serial No. 444,869

9 Claims. (Cl. 175—294)

My invention relates to protective arrangements and more particularly to a protective arrangement employing a fuse-controlled switch for accomplishing certain changes in the electrical connections of the device being protected.

In connection with electrical transmission systems, it is sometimes desirable to correct the power factor by providing suitable capacitor banks connected to the system. In such systems, particularly where three-phase four-wire transmission lines are used, harmonic currents will flow in the neutral conductor if a star or Y-connected capacitor bank is used having a grounded neutral conductor. In these cases, the third harmonic current particularly and perhaps other higher harmonic currents may cause serious inductive interference on adjacent communication lines. It has been discovered that, if the neutral of the star or Y-connected capacitor bank is ungrounded, such harmonic currents do not flow and, consequently, such interference on adjacent communication lines is eliminated. However, operation of such star-connected capacitor banks with an isolated neutral is dangerous since, in the case of failure of a capacitor in one phase of the star-connected unit, a displacement of the neutral of the three-phase voltage system would result so that dangerous overvoltages might be applied to the capacitors in the other phases. Accordingly, it would be desirable to provide a protective arrangement for a polyphase star-connected capacitor bank wherein the neutral thereof may be isolated from ground under all normal operation to prevent telephone interference and yet whereby such neutral may be grounded, when any one of the capacitors of the star-connected unit should fail, to preclude any dangerous voltages on the other capacitors of the bank.

As will be brought out in the ensuing description, similar problems arise with series capacitors and with other circuits to which modifications of my protective arrangement are also applicable.

It is an object of my invention, therefore, to provide a new and improved protective arrangement for electric circuits.

It is another object of my invention to provide a protective arrangement for a star or Y-connected capacitor bank having an isolated neutral whereby the neutral thereof may be grounded upon failure of any capacitor in said Y-connected bank.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a schematic diagram of a protective arrangement embodying my invention showing a control device forming a part thereof in a somewhat detailed sectional view, Fig. 1a is a diagram identical with Fig. 1 except that the control device is schematically illustrated, Fig. 2 illustrates a modification of the protective arrangement of Fig. 1a, Fig. 3 illustrates another application of a protective system employing the control devices of Figs. 1a and 2, and Figs. 4, 5, and 6 illustrate still other applications of protective arrangements employing control devices somewhat similar to the control device shown in Fig. 1.

Referring now to Fig. 1, I have illustrated a polyphase circuit 10 including three phase conductors 10a, 10b, 10c and a neutral conductor 11 which is connected to ground as indicated at 12. A capacitor bank consisting of three capacitors 13a, 13b, 13c is connected to the circuit or transmission line 10 through fuses 14a, 14b, and 14c, respectively. The capacitor bank is preferably star or Y-connected and, as will become apparent from the following description, the neutral point of star or Y-connected banks is normally maintained in an isolated condition with respect to ground, thereby preventing harmonic currents from flowing in the ground or neutral circuit to cause telephone or other communication interference. In order that the isolated neutral of the capacitor bank may be grounded whenever one of the capacitors fails, I provide a suitable control device generally indicated at 15 which is preferably similar to the electric circuit-interrupting devices disclosed in my prior United States Letters Patent 2,169,087 and 2,267,393 assigned to the same assignee as the present application.

The control device 15 of Fig. 1 has been illustrated as substantially identical in certain respects with the device disclosed in Patent 2,169,087 referred to above and, consequently, will be only briefly described hereinafter, the essential portions thereof in so far as the present invention is concerned being shown in the schematic disclosure in Fig. 1a. The device 15 is illustrated as being constructed in the form of an enclosed type of reclosing cutout including an insulating housing 16 having spaced terminals 17 and 18 mounted therein. The casing 16 is provided with an open front and bottom, the open front being closed by a suitable door 19 having a recessed portion for accommodating a plurality of fuse holders designated as 20 and 21, respectively. The fuse holders 20 and 21 of the expulsion type consist of fuse tubes 22 of insulating material having upper terminals 23 screwed on the upper ends of the fuse tube which are closed by contact caps 24. Suitable electrical conductors which may or may not include fusible elements are disposed within tubes 22 in a manner similar to the method in which fuse links were disposed in the fuse tubes of my prior patents referred to above, the upper end of these electrical conductors being in the form of a buttonhead 25 so as readily to make contact with the upper terminals 23 by means of contact caps 24 of fuse holders 20 and 21, respectively.

As illustrated in Fig. 1, the two fuse holders 20 and 21 are maintained in parallel and relatively close side-by-side relationship by means of a supporting element 26 having openings in which the fuse holders are secured as by means of pins or screws 27. Fuse holder 20 is longer than fuse holder 21 and is arranged as illustrated so that its lower end projects considerably below the level of the lower open end of fuse holder 21, thereby preventing gases expelled from fuse holder 20 from coming too close to the lower end of fuse holder 21. The fuse holders and their supporting elements constitute a part of a unitary assembly adapted to be removably installed in cutout housing or casing 16.

A toggle lever 28 is provided for removably supporting the fuse holders 20 and 21 and their supporting element 26 in casing 16. One end of this lever is pivotally attached at 29 to a terminal collar 30 clamped on the lower end of fuse holder 21 and the other end of the lever has a hookshaped portion 31 for detachable engagement with a hinge pin 32 carried by hinge bracket 33. The circuit-controlled device 15 differs from the arrangements disclosed in my prior patents in that terminal collar 30 is electrically connected through lever 28, hinge pin 32, hook-shaped portion 31 of lever 28, and hinge bracket 33 to a terminal 34, the purpose of which will be described hereinafter in connection with modifications of my invention.

As will be seen from Fig. 1, terminal collar 30 is normally electrically isolated from lower cutout terminal 18 by means of a portion of the insulating tube 22 of fuse holder 21. Toggle lever 28 is normally held in rigid relationship with respect to fuse holder 21 by means of an extension 35 of the electrical conductor within tube 22 of fuse holder 21 which may or may not include a fusible element but which includes the buttonhead terminal 25 at the upper end thereof. Under normal conditions, therefore, the electrical conductor within fuse holder 21 is electrically connected at the upper end to terminal 17 but is electrically isolated from terminal 18 at the lower end thereof. The upper ends of the fuse holders 20 and 21 are held together by means of a metal clamp 36, thereby electrically connecting the upper ends of the fuse holders as well as aiding in maintaining the fuse holders in proper relationship.

The fuse holder assembly including fuse holders 20 and 21 is attached to recessed door 19 by means of a retaining clip 37 secured to the inner face of the door as by means of a screw 38. The lower end of the fuse holder assembly is normally held in its position within the recess of door 19 by means of an extension 39 of the electrical conductor, which may or may not include a fusible element, supported within fuse holder 20. The extension 39 is clamped by means of a wing screw 40 to the metal terminal 41 carried by an inwardly projecting ledge or boss 42 on the lower inner face of the door 19. Terminal 41 is provided with a downwardly extending snubber 43 about which the conductor extension 39 is wrapped to insure proper clamping of the extension to the terminal 41.

In the arrangement indicated in Fig. 1, the electrical conductor mounted within fuse holder 20 is connected between the terminals or contacts 17 and 18, the normal circuit extending through contact fingers 44, upper fuse holder terminals 23, the electrical conductor within fuse holder 20 and the extension 39 thereof, terminal 41, a flexible shunt conductor 45 connected between terminal 41 and supporting element 26, supporting element 26, and a contact-engaging arm 46. Arm 46 is pivotally supported on the inner end of element 26 and is biased by suitable spring means to press against a cooperating contact face of lower terminal 18.

In the event that a fuse link is provided in fuse holder 20 which is ruptured upon excessive currents flowing therethrough, the circuit may be reclosed through the electrical conductor in fuse holder 21 by means of a suitable circuit-reclosing mechanism which is mounted on the outer end of fuse holder supporting element 26. This reclosing mechanism is completely described in my prior patents and only a brief description of the essential portions thereof will be included herewith. This reclosing mechanism includes a switch-supporting element 47 upon which is pivotally mounted at 48 a suitable switch 49 biased for counterclockwise rotation as viewed in Fig. 1 by suitable spring means not shown. In the position indicated in Fig. 1, the switch-supporting element 47, which is vertically movable, is in its uppermost position so that switch 49 is held in the vertical position indicated by detents 50, which prevent counterclockwise rotation thereof. Actually, the switching element 49 comprises two members one on either side of fuse holder 20 and corespondingly two detents 50 are provided, only one of which is shown in the drawings since the other is hidden by other parts of the control device. The vertically movable switch supporting element 47 is continually biased in a downward direction by spring means not shown. The extension 39 of the conductor within fuse holder 20 holds switch supporting element 47 in a position so that projecting feet 51 which form part of terminal 41 engage with shoulders on the downwardly projecting extension of the switching element 49. Whenever the electrical conductor within fuse holder 20 which may include a fusible element is severed, leaf spring member 52 tends to move the lower end of door 19 away from the fuse holder assembly so that the feet 51 of terminal 41 releases the downwardly biased switch-supporting element 47, whereupon downward movement of element 47 occurs until switch 49 is free of detents 50. If desired, this downward movement may be retarded by a suitable time-delay mechanism generally indicated at 53 although, for certain applications, such retardation may not be desirable. As soon as switching member 49 is free of detents 50, counterclockwise rotation thereof occurs to cause engagement with contacts 54, one of which is shown in the drawings carried by terminal collar 30 mounted on the lower end of fuse holder 21, thereby completing the circuit between terminals 17 and 18 through the conductor in fuse holder 21. In order to provide a good electrical path between switching member 49 and the fuse holder supporting element 26, a flexible shunt strip 55 is provided. In view of the detailed description of a control device almost identical with 15 shown in Fig. 1 of the present application included in my prior Patent 2,169,087, the operation and general detailed construction thereof will be obvious to one skilled in the art and no further discussion will be included here. Returning now to the problem of providing a ground connection for the neutral of the capacitor bank, including capacitors 13a, 13b, and 13c of Figs. 1 and 1a, only upon failure of one of the capacitors of the bank and otherwise operating the neutral of the bank isolated from ground, I have illustrated the neutral of a star or Y-connected bank connected directly to terminal 17 of control device 15 as by conductor 58. Similarly, terminal 18 is connected to ground as by conductor 59. In Figs. 1 and 1a, the conductor in fuse holder 20 is constructed in a manner to include a fusible element 61 which may or may not be paralleled by a strain wire such as 62 shown in Fig. 1, which fusible element is connected in series with suitable dielectric means such as a film cutout or as illustrated in the drawings a gap 63 best shown in the schematic diagram of Fig. 1a. With this arrangement, the neutral of the Y-connected capacitor bank is isolated by the gap 63 in fuse holder 20. This gap is so designed to arc over whenever the voltage there across exceeds a predetermined value. Upon failure of any of the capacitors in a Y-connected bank, a high voltage occurs between the neutral and ground sufficient to arc over spark gap 63, whereupon fuse 61 will rupture and permit switch 49 to engage contacts 54. If a suitable non-fusible conductor 64 is provided in fuse holder 21, operation of switch 49 to engage contacts 54 will connect the normally isolated neutral of the capacitor bank to ground.

With the arrangement just described, the star or Y-connected capacitor bank may be operated with an isolated neutral to prevent telephone interference and yet, if one of the capacitors of the bank should fail, grounding of the neutral of the bank would occur immediately through operation of control device 15, thereby preventing dangerous overvoltages from being applied to the capacitors in the other phases.

Various modifications of the particular type of conductors contained within fuse holders 20 and 21 may be made to still obtain similar operation of control device 15. In Fig. 2, I have shown a modification of the connections of control device 15 for grounding the isolated neutral of a Y-connected capacitor in the event of failure of one of the capacitors. The corresponding parts of Fig. 2 are designated by the same reference numerals as in Figs. 1 and 1a. Instead of providing a nonfusible conductor in fuse holder 21 and a fusible element in series with a gap in fuse holder 20 as in Figs. 1 and 1a, I provide only a fusible element 61 in fuse holder 20 and the gap 63 in fuse holder 21. In this case, however, the ground conductor 59 is connected to terminal 34 described above which is electrically connected with contacts 54. Also, the neutral of the Y-connected capacitor bank is connected to terminal 18 through conductor 58. Terminal 17 is not connected in the circuit. It will be obvious from Fig. 2 that the neutral of the Y-connected bank is isolated from ground by virtue of gap 63 which is connected in series with fusible element 61 as in Fig. 1a although, in this case, the gap and the fusible element are in separate fuse holders. Upon failure of any one of the capacitors, a line-to-ground voltage appears across gap 63 which arcs over to permit current to flow through fusible element 61 to cause rupture thereof. Thereupon, fuse controlled switch 49 operates to engage contacts 54 to complete the ground connection for the neutral of the Y-connected capacitor bank.

Although I have disclosed a specific type of control device 15 in Fig. 1, it will be obvious that the structural details thereof are not important as is obvious from the schematic showings of Figs. 1a and 2 and any suitable means for obtaining the operation described above may be used.

While I have disclosed my protective arrangement specifically as applied to protecting a Y-connected capacitor bank having an isolated neutral, I have discovered that the control device 15 of Figs. 1a and 2 may be used in other protective arrangements. Accordingly, in Fig. 3, I have illustrated a protective arrangement for a street lighting circuit of the type including a return conductor running parallel to and adjacent a line containing the street lights. This is schematically shown in Fig. 3 where a source of current 70 is connected through a constant current transformer 71 to a street-lighting circuit comprising a plurality of lamps 72 connected in one line 72' with a parallel return conductor 73. If any one of the series lights should fail, it would be desirable to bridge the lines 72' and 73 so that the portion of the circuit between the source and the defective lamp may still be operated or maintained in service. Accordingly, at suitable points, such as 74 and 75, along the street-lighting circuit, I connect control devices 15' and 15" such as 15 of Fig. 1. As illustrated in Fig. 3, I connect the terminals 17 and 18 of a control device 15' at 74. The corresponding parts of control device 15' are designated by the same reference numerals as in Figs. 1 and 2 and control device 15' is identical with the control device 15 of Fig. 1a. Similarly, at point 75 on the street-lighting circuit, I connect the terminals 18 and 34 of control device 15" which is identical with control device 15 of Fig. 2. The operation of the arrangement disclosed in Fig. 3 will be obvious to those skilled in the art since, whenever a lamp should fail, the voltage across the street-lighting circuit will rise by virtue of the inherent characteristics of the constant current transformer, whereupon gap 63 will arc over and permit fuse controlled switch 49 to engage contacts 54 and bridge the two conductors of the street-lighting circuit.

Many schemes for protecting series capacitors or rather systems employing series capacitors have been suggested. In all of these arrangements, it is desirable to short circuit the series capacitor in case of a fault on the system, thereby preventing dangerous overvoltages from being applied to the capacitor. I have discovered that the control device 15 described heretofore may be utilized very satisfactorily for such a purpose and, accordingly in Figs. 4, 5, and 6, I have disclosed several different arrangements for protecting a series capacitor connected in a system against dangerous overvoltages which might occur by virtue of faults on the circuit beyond the series capacitor. It will be understood by those skilled in the art that, as long as normal load and insulation exist on the circuit, the series capacitor is not subjected to more than its normal share of the voltage. However, in the case of a fault on the portion of the circuit beyond the capacitor, particularly if the fault is closely adjacent to the capacitor, one terminal of the capacitor assumes substantially ground potential if the fault is a ground fault, which means that full line voltage and possibly even higher voltages due to resonant conditions would be applied to the series capacitor which would damage it in a very short space of time.

Referring now to Fig. 4 where the corresponding parts of the control device 15 are designated by the same reference numerals as in Figs. 1 and 2, I have illustrated a transmission line 78 including in series therewith a capacitor 79. In order that capacitor 79 may be short circuited in the event of a fault on line 78, I provide control device 15 having a fusible element 61 connected in fuse holder 20 while no conductor of any kind is provided in fuse holder 21. One terminal of series capacitor 79 is connected to terminal 17 of control device 15 while the other terminal of series capacitor 79 is connected to terminal 34. A suitable dielectric means, such as external gap 80, may be connected across capacitor 79. Upon the occurrence of a fault on line 78 which would cause dangerously high voltages across capacitor 79, a high current will flow in line 78 and, consequently, through fusible element 61 which will cause rupture thereof, whereupon switching element 49 operates to engage contacts 54, thereby providing a path in shunt with capacitor 79. Furthermore, gap 80 may break down to limit the voltage across capacitor 79. The operation of the arrangement disclosed in Fig. 4 in which no gap is used in the fuse holders 20 and 21 will be obvious to those skilled in the art in view of the detailed description included above.

In Fig. 5, a gap 63 is provided in fuse holder 21 while the fusible element 61 is provided in fuse holder 20. One terminal of capacitor 79 is connected to terminal 17 of control device 15 while the other terminal of capacitor 79 is connected to terminal 34. The circuit through capacitor 79 is completed from terminal 18 through fusible element 61, terminal 17, and capacitor 79. The operation of the arrangement disclosed in Fig. 5 will be substantially identical to that disclosed in Fig. 4 and no further discussion will be included here since the only difference is that the dielectric means is mounted within the control device 15 rather than externally as in Fig. 4.

It might be desirable to provide a protective arrangement for a series capacitor, such as is shown in Figs. 4 and 5, in which the fusible element would not be required to carry the normal load current but will only carry current when the dielectric means, such as the arc gap, was rendered conducting. Accordingly, in Fig. 6, I have illustrated the control device 15 of Fig. 2 as connected to protect a series capacitor 79 connected in circuit 78 with one terminal of the capacitor being connected to terminal 18 of the control device 15 while the other terminal of the capacitor 79 is connected to terminal 34. The corresponding parts of Fig. 6 are designated by the same reference numerals as in the preceding figures. Since the fuse 61 in Fig. 6 is in the gap circuit, it would be desirable to connect a suitable impedance such as resistor 80 in Fig. 6, across the fusible element to keep the voltage across capacitor 79 down when the fuse blows and prior to the closing of switch 49. The operation of the arrangement disclosed in Fig. 6 will be obvious to those skilled in the art.

Although I have disclosed several different protective arrangements embodying my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a polyphase electric system having a grounded neutral conductor, a star-connected bank of capacitors connected to the system and having its neutral point normally isolated from the system neutral substantially to eliminate inductive interference with adjacent communication lines, and a control device operative in response to failure of a capacitor in said bank of capacitors for connecting said neutral of said star-connected bank of capacitors to ground to protect the unfaulted capacitors of said bank against dangerous overvoltages.

2. In a polyphase electric system having a grounded neutral conductor, a star-connected bank of capacitors connected to the system and having its neutral point normally isolated from the system neutral substantially to eliminate inductive interference with adjacent communication lines, and a control device including a pair of terminals, means for connecting one of said terminals to the neutral of said star-connected capacitor bank, means for connecting another of said terminals to ground, a serially connected dielectric means and fusible element interconnecting said terminals, said dielectric means maintaining said neutral of said star-connected capacitor bank isolated from ground under normal conditions of said bank, and a switching member operative in response to rupture of said fusible element for completing a circuit between said terminals to ground the neutral of said capacitor bank, said fusible element being designed to rupture when said dielectric means becomes conducting in response to the increased voltage impressed thereon upon failure of one of the capacitors in said bank.

3. In combination with an electric circuit subject to faults thereon which might produce undesirable consequences on the same or associated circuits, a protective arrangement comprising a control device including a housing, a pair of fuseholders mounted in said housing, a member adapted to conduct current connected to said circuit and extending into one of said fuseholders, switching means supported in such housing for changing the connections of said member and said circuit, a plurality of terminals for said control device connected to said circuit in a predetermined manner, means including a fusible element mounted in the other of said fuseholders for maintaining said switching means in a non-conducting position, and means serially connected with said fusible element for preventing current from flowing through said fusible element prior to the occurrence of a predetermined fault condition on said electric circuit, said fusible element being arranged to rupture in response to such faults on said electric circuit for releasing said switching means.

4. In combination with an electric circuit subject to faults thereon which might produce undesirable consequences on the same or associated circuits, a protective arrangement comprising a control device including a housing having a plurality of spaced terminals associated therewith, means for connecting said terminals with said electric circuit, a pair of fuseholders mounted in said housing, a member adapted to conduct current connected to said circuit and extending into one of said fuseholders, switching means supported in said housing for changing the connections of said member and said circuit, means including a fusible element mounted in the other of said fuseholders for maintaining said switching means in a nonconducting position, and dielectric means serially connected with said fusible element for preventing current from flowing through said fusible element under unfaulted conditions of said circuit, said dielectric means being so constructed and arranged as to permit current to flow through said fusible element to cause rupture thereof and release of said switching means in response to such faults on said electric circuit.

5. In combination with an electric circuit subject to faults thereon which might produce undesirable consequences on the same or associated circuits, a protective arrangement comprising a control device including a housing having a plurality of spaced terminals associated therewith, means for connecting said terminals with said electric circuit, a pair of fuse holders mounted in said housing, a fusible element in one of said fuse holders, a member adapted to conduct current connected to said circuit and extending into one of said fuseholders, switching means supported in said housing for changing the connections of said member and said circuit, and dielectric means serially connected with said fusible element for preventing current from flowing through said fusible element prior to the occurrence of a predetermined fault condition on said electric circuit, means including said fusible element for maintaining said switching means in a nonconducting position when said fusible element is in an unblown condition, said fusible element being caused to rupture and release said switching means upon the occurrence of such a fault on the electric circuit as would cause current to flow through said dielectric means.

6. In combination with an electric circuit subject to faults thereon which might produce undesirable consequences on the same or associated circuits, a protective arrangement comprising a control device including a housing having a plurality of spaced terminals associated therewith, means for connecting said terminals with said electric circuit, a pair of fuse holders mounted in said housing, a fusible element in one of said fuse holders, dielectric means in the other of said fuse holders, means for connecting said dielectric means and said fusible element in series so that said dielectric means prevents current from flowing through said fusible element under unfaulted conditions of said circuit, switching means supported in said housing for changing the connections of said circuit, means including said fusible element for maintaining said switching means in a nonconducting position when said fusible element is in an unblown condition, said dielectric means being so constructed and arranged as to be rendered conducting upon the occurrence of a fault on said electric circuit thereby permitting said fusible element to rupture and release said switching means.

7. In a polyphase electric system having a grounded neutral conductor, a star-connected bank of capacitors connected to the system and having its neutral point normally isolated from the system neutral or ground substantially to eliminate inductive interference with adjacent communication lines, and a control device comprising a housing including a plurality of terminals mounted therein, means for connecting one of said terminals to the neutral of said star-connected capacitor bank, means for grounding another of said terminals, means including a serially connected dielectric means and fusible element mounted within said housing and connected between said terminals, said dielectric means maintaining said neutral of said star-connected capacitor bank isolated from ground under normal conditions of said bank, and a switching member normally maintained in the open position by means including said fusible element adapted to interconnect said terminals and, consequently, to ground said star-connected capacitor bank, said dielectric means being designed to become conducting and permit current to flow through said fusible element to cause rupture thereof and release of said switching means in response to the increased voltage impressed thereon upon failure of one of the capacitors in said bank.

8. In combination with an electric circuit including an electrical device subject to dangerous overvoltages in the event of certain fault conditions on said circuit, means for by-passing said electrical device in the event of such a fault condition comprising a control device including a normally open switching means adapted to complete an electrical circuit around said electrical device, a fusible element serially connected with said electrical device for maintaining said switching means in the open position, and an arc gap connected across said electrical device, said fusible element being so constructed and arranged to rupture in response to currents flowing therethrough subject to overvoltages appearing across said electrical device to permit release of said switching means and by-passing of said electrical device.

9. In combination with an electric circuit including an electrical device subject to dangerous overvoltages in the event of certain fault conditions on said circuit, means for by-passing said electrical device in the event of such a fault condition comprising a control device including a housing having a plurality of terminals associated therewith, means for connecting said terminals with said electric circuit, a pair of fuseholders mounted in said housing, a member adapted to conduct current connected to said circuit and extending into one of said fuseholders, switching means mounted in said housing and adapted when closed to complete an electrical circuit between a pair of said terminals to by-pass said electrical device with respect to said circuit and effectively change the connections of said member, and a fusible element mounted in the other of said fuseholders for maintaining said switching means in the open position, said fusible element being designed to rupture in response to currents flowing therethrough upon the occurrence of abnormal voltages appearing across said electrical device to permit release of said switching means and by-passing of said electrical device.

RALPH S. BENNETT.